(12) United States Patent
Kishimoto et al.

(10) Patent No.: US 6,567,357 B2
(45) Date of Patent: May 20, 2003

(54) OPTICAL DISK APPARATUS

(75) Inventors: Takashi Kishimoto, Nara (JP); Yuuichi Kuze, Osaka (JP); Kenji Fujiune, Osaka (JP); Takeharu Yamamoto, Osaka (JP); Katsuya Watanabe, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 236 days.

(21) Appl. No.: 09/839,522

(22) Filed: Apr. 20, 2001

(65) Prior Publication Data

US 2001/0055254 A1 Dec. 27, 2001

(30) Foreign Application Priority Data

Apr. 24, 2000 (JP) ........................................ 2000-122683

(51) Int. Cl.[7] ................................................. G11B 7/00
(52) U.S. Cl. ................. 369/53.14; 369/53.1; 369/44.28; 369/44.32
(58) Field of Search ............................... 369/53.1, 53.14, 369/53.15, 53.17, 53.18, 53.19, 53.23, 47.1, 44.23, 44.25, 44.27, 44.28, 44.32, 44.34

(56) References Cited

U.S. PATENT DOCUMENTS 5,903,530 A * 5/1999 Tateishi et al. .......... 369/44.27
6,298,019 B1 * 10/2001 Watanabe et al. ........ 369/44.27

FOREIGN PATENT DOCUMENTS

| JP | 7-318939 | 12/1995 |
| JP | 9-512648 | 12/1997 |
| JP | 2000-28960 | 1/2000 |
| JP | 2000-207750 | 7/2000 |
| WO | WO 96/03842 | 2/1996 |

* cited by examiner

*Primary Examiner*—Muhammad Edun
(74) *Attorney, Agent, or Firm*—Merchant & Gould P.C.

(57) ABSTRACT

An optical disk apparatus of the present invention measures a surface deflection component (shape of surface deflection) from a low-pass component of a compensating filter in a surface deflection measuring part provided in a DSP. Furthermore, the optical disk apparatus calculates timing at which a positional change in a surface deflection component in time required for focus jumping is a predetermined value or less in a timing calculating part, and starts focus jumping at the timing. Because of this, stable focus jumping is made possible.

27 Claims, 11 Drawing Sheets

OPTICAL DISK APPARATUS

BACKGROUND OF THE INVENTION

1. Field of the Invention

The present invention relates to an optical disk apparatus for optically reproducing information recorded on a recording medium by utilizing a light beam from a light source such as a laser. In particular, the present invention relates to focus jumping control for moving a light beam spot from a recording/reproducing surface to another recording/reproducing surface on a recording medium having a plurality of recording/reproducing surfaces.

2. Description of the Related Art

In general, an optical disk apparatus conducts focus control by moving a converging lens in a direction substantially vertical to a recording/reproducing surface of a recording medium with a focus actuator. The focus actuator is composed of a movable part and a fixed part attached to a converging lens. The movable part and the fixed part are bound to each other via four wires or an elastic substance such as rubber. When an electric current flows through a coil provided in the movable part, an electromagnetic force is generated between the coil and a permanent magnet provided in the fixed part, thereby moving the converging lens in a direction substantially vertical to the recording/reproducing surface of the recording medium. The direction substantially vertical to the recording/reproducing surface refers to a vertical direction and a direction containing a slight deflection from the vertical direction. Furthermore, in the case where a recording/reproducing surface on which focus control currently is conducted is not a desired one, search for a desired information track on a recording medium having a plurality of recording/reproducing surfaces is conducted by repeating focus jumping to an adjacent recording/reproducing surface a plurality of times to conduct focus control on a desired recording/reproducing surface, and searching for a desired track.

Hereinafter, a conventional focus jumping method will be described in detail with reference to the drawings. FIG. 9 is a block diagram showing a schematic structure of a conventional optical disk apparatus that conducts focus jumping by a conventional focus jumping method. FIG. 9 shows a state of the optical disk apparatus during focus jumping. The conventional optical disk apparatus includes a disk motor 102 for rotating an optical disk 101 with two recording/reproducing surfaces (L0 surface, L1 surface) at a predetermined rotation speed, an optical head 103 (composed of a light source such as a semiconductor laser, a coupling lens, a polarized beam splitter, a polarizing plate, a converging lens, a condensing lens, a dividing mirror, a photodetector, and the like (not shown)) for reproducing information from the optical disk 101, and a traverse motor (not shown) for moving the entire optical head 103 in a direction vertical to a track of the optical disk 101.

A light beam generated by a light source is collimated by the coupling lens, reflected from the polarized beam splitter, passes through the polarizing plate, and is converged by the converging lens. In this manner, a light beam spot with a focus point in a thickness direction of the optical disk 101 is formed. The light beam spot is radiated to the optical disk 101 that is rotated by the disk motor 102. Light reflected from the optical disk 101 passes through the converging lens, the polarizing plate, the polarized beam splitter, and the condensing lens, and is split into light beams in two directions by the dividing mirror. One of the divided light beams is input to a focus control apparatus through a photodetector with a two-division structure. The focus control apparatus is composed of a focus error signal generating part 104, a digital signal processor (DSP) 901 as a focus control part, a focus driving circuit 111, and a focus actuator (not shown). The focus error signal generating part 104 is provided as a converged state detecting part for generating a signal corresponding to a converged state of a light beam. In the focus error signal generating part 104, an output signal from the two-division photodetector is input to a differential amplifier. An output signal from the differential amplifier becomes a positional shift signal (focus error (FE) signal) representing a shift between a converged point of a light beam and the optical disk 101, and is input to the DSP 901. The detection of the FE signal is called an "SSD method".

Focus control will be described. The FE signal input to the DSP 901 is converted from an analog signal to a digital signal by an AD converter 105, and is input to a compensating filter 107, which is a digital filter composed of an adder, a multiplier, and a delay circuit, through a switch 106. The compensating filter 107 compensates for a phase and the like of a focus control system. The FE signal with its phase compensated by the compensating filter 107 is input to an adder 109 through a gain switching circuit 108 that switches a loop gain of the focus control system. A switch 114 is turned off during focus control. Therefore, the FE signal passing through the gain switching circuit 108 passes through the adder 109 as it is, is converted from a digital signal to an analog signal by a DA converter 110, and is input to the focus driving circuit 111. The focus driving circuit 111 amplifies an output signal from the DSP 901 and converts its level in an appropriate manner, thereby driving the focus actuator. In this manner, the focus actuator is driven so that a light beam on the optical disk 101 takes a predetermined converged state, whereby focus control is realized.

On the other hand, the other light beam divided by the dividing mirror is input to a tracking control apparatus (not shown) via a photodetector with a four-division structure, which detects a signal representing a shift between a converged point of a light beam and a track on the optical disk 101, i.e., a track shift signal (tracking error (TE) signal) for controlling a converged point of a light beam to scan a track on the optical disk 101, and conducts tracking control based on the TE signal so that a converged point of a light beam scans a predetermined track on the optical disk 101. A structure and operation of the tracking control apparatus are not related to the description of the focus jumping method directly; therefore, the description thereof will be omitted.

The DSP 901 is provided with the switches 106 and 114. During focus control, the switch 106 is turned on, and the switch 114 is turned off. During focus jumping, the switch 106 is turned off, and the switch 114 is turned on. The switch 106 opens/closes a loop of the focus control system, and switches between an input signal during focus control and an input signal during focus jumping with respect to the compensating filter 107

Next, the focus jumping method will be described with reference to a waveform diagram in FIG. 10 and a flow chart in FIG. 11, as well as the block diagram in FIG. 9. FIG. 10 is a waveform diagram showing a FE signal and a focus driving waveform during focus jumping from the L0 layer to the L1 layer of the optical disk 101. During focus jumping from the L1 layer to the L0 layer, the polarity of the FE signal and the focus driving waveform become inverse to that of the waveforms shown in FIG. 10. Therefore, the waveform diagram and description thereof in this case will be omitted.

As is understood from the block diagram in FIG. 9, the switch 106 is turned off during focus jumping, and the compensating filter 107 is operated at an input zero. Therefore, the FE signal passing through the gain switching circuit 108 holds a low-pass component (surface deflection component) at the beginning of focus jumping. The adder 109 adds an acceleration/deceleration pulse signal generated in an acceleration/deceleration pulse generating part 113 to the low-pass component at the beginning of focus jumping, which has passed through the gain switching circuit 108. The addition signal drives the focus actuator, whereby the instability of focus jumping caused by surface deflection of the optical disk 101 is reduced.

First, at Step S1101, the switch 106 is turned off, and the switch 114 is turned on (set a position for focus jumping). At Step S1102, when an acceleration pulse (predetermined peak value A1) starts being output, the optical head 103 starts moving toward the L1 layer of the optical disk 101, and an FE signal in a sine wave is generated in accordance therewith. At Steps S1103 and S1104, an acceleration pulse is output for a predetermined period of time (T1), and the process waits until a zero crossing point (Z point in FIG. 10) of the FE signal is detected at Step S1105. The zero crossing point is detected by detecting a crossing point between the FE signal passing through the AD converter 105 and a predetermined level (zero in this case) in the level detecting part 112. At Step S1106, a deceleration pulse (predetermined peak value A2) starts being output. At Steps S1107 and S1108, a deceleration pulse is output for a predetermined period of time (T2). Thereafter, at Step S1109, the switch 106 is turned on, and the switch 114 is turned off (set at a position for focus control), whereby focus jumping to another recording/reproducing surface (e.g., from the L0 layer to the L1 layer) is completed, and focus control is restarted.

As described above, the conventional optical disk apparatus has a structure in which during focus jumping from a recording/reproducing surface to another recording/reproducing surface, a surface deflection component (shape of surface deflection) of the optical disk at the beginning of jumping is held, and a predetermined peak value, i.e., an acceleration/deceleration pulse are applied to the focus actuator for a predetermined period of time.

Herein, drawbacks of focus jumping in the case of reproducing information from an optical disk at a high speed by using the conventional optical disk apparatus will be described. In the case of reproducing information from an optical disk at a high speed, a ratio of focus jumping time to one rotation time of an optical disk is increased compared with the case of reproducing information from an optical disk at a low speed. Therefore, the position of surface deflection at the beginning of jumping substantially may be different from that at the end of jumping due to the influence of surface deflection of the optical disk. The above-mentioned conventional optical disk apparatus holds a surface deflection component at the beginning of jumping, and applies an acceleration/deceleration pulse to the surface deflection component. Therefore, during high-speed reproduction, the difference between the position a light beam reaches at the end of jumping and the position of surface deflection becomes remarkable, which makes focus jumping unstable.

SUMMARY OF THE INVENTION

Therefore, with the foregoing in mind, it is an object of the present invention to provide an optical disk apparatus that is capable of conducting high-speed reproduction with stable focus jumping performance by storing a surface deflection component (a surface deflection shape) in one rotation of an optical disk and starting focus jumping in the case where a positional change of a surface deflection component during focus jumping is a predetermined value or less.

Another object of the present invention is to provide an optical disk apparatus that is capable of conducting high-speed reproduction with stable focus jumping performance by storing a surface deflection component in one rotation of an optical disk and updating the surface deflection component held at the beginning of jumping during focus jumping, using the stored values.

In order to achieve the above-mentioned objects, the optical disk apparatus of the present invention for reproducing information recorded on a recording medium includes: a moving part for moving a converged point of a light beam converged on a recording medium having a plurality of stacked recording/reproducing surfaces in a direction substantially vertical to the recording/reproducing surfaces; a converged state detecting part for generating a signal corresponding to a converged state of the light beam on the recording medium; a focus control part for driving the moving part in accordance with a focus error signal that is an output signal from the converged state detecting part, in such a manner that the light beam is converged at a substantially constant position on the recording medium; a focus jumping part for moving the converged point of the light beam from an arbitrary recording/reproducing surface of the recording medium to another recording/reproducing surface thereof; a surface deflection measuring part for measuring a shape of surface deflection of the recording medium; and a jumping starting part for operating the focus jumping part based on measurement results of the surface deflection measuring part.

Furthermore, the optical disk apparatus of the present invention includes: a moving part for moving a converged point of a light beam converged on a recording medium having a plurality of stacked recording/reproducing surfaces in a direction substantially vertical to the recording/reproducing surfaces; a converged state detecting part for generating a signal corresponding to a converged state of the light beam on the recording medium; a focus control part for driving the moving part in accordance with a focus error signal that is an output signal from the converged state detecting part, in such a manner that the light beam is converged at a substantially constant position on the recording medium; a focus jumping part for moving the converged point of the light beam from an arbitrary recording/reproducing surface of the recording medium to another recording/reproducing surface thereof; a surface deflection measuring part for measuring a shape of surface deflection of the recording medium; a surface deflection storing part for storing the measurement results of the surface deflection measuring part in a memory successively on a predetermined phase basis over one rotation of the recording medium; a converged position holding part for holding a converged position of the light beam at the beginning of focus jumping; and a surface deflection correcting part for updating the converged position of the light beam held by the converged position holding part during focus jumping, based on the stored values in the surface deflection storing part.

According to the above-mentioned structures, the optical disk apparatus of the present invention can store a surface deflection component in one rotation of an optical disk and start focus jumping in the case where a positional change in the surface deflection component during focus jumping to another recording/reproducing surface is a predetermined value or less. Because of this, an optical disk apparatus capable of conducting high-speed reproduction with stable focus jumping performance can be provided. It should be noted that a substantially vertical direction refers to a vertical direction and a direction containing a slight deflection from the vertical direction. It also should be noted that a substantially constant position of a light beam includes a slight deflection from a converged position.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described in detail by way of illustrative embodiments with reference to the drawings.

Embodiment 1

Figure 1:
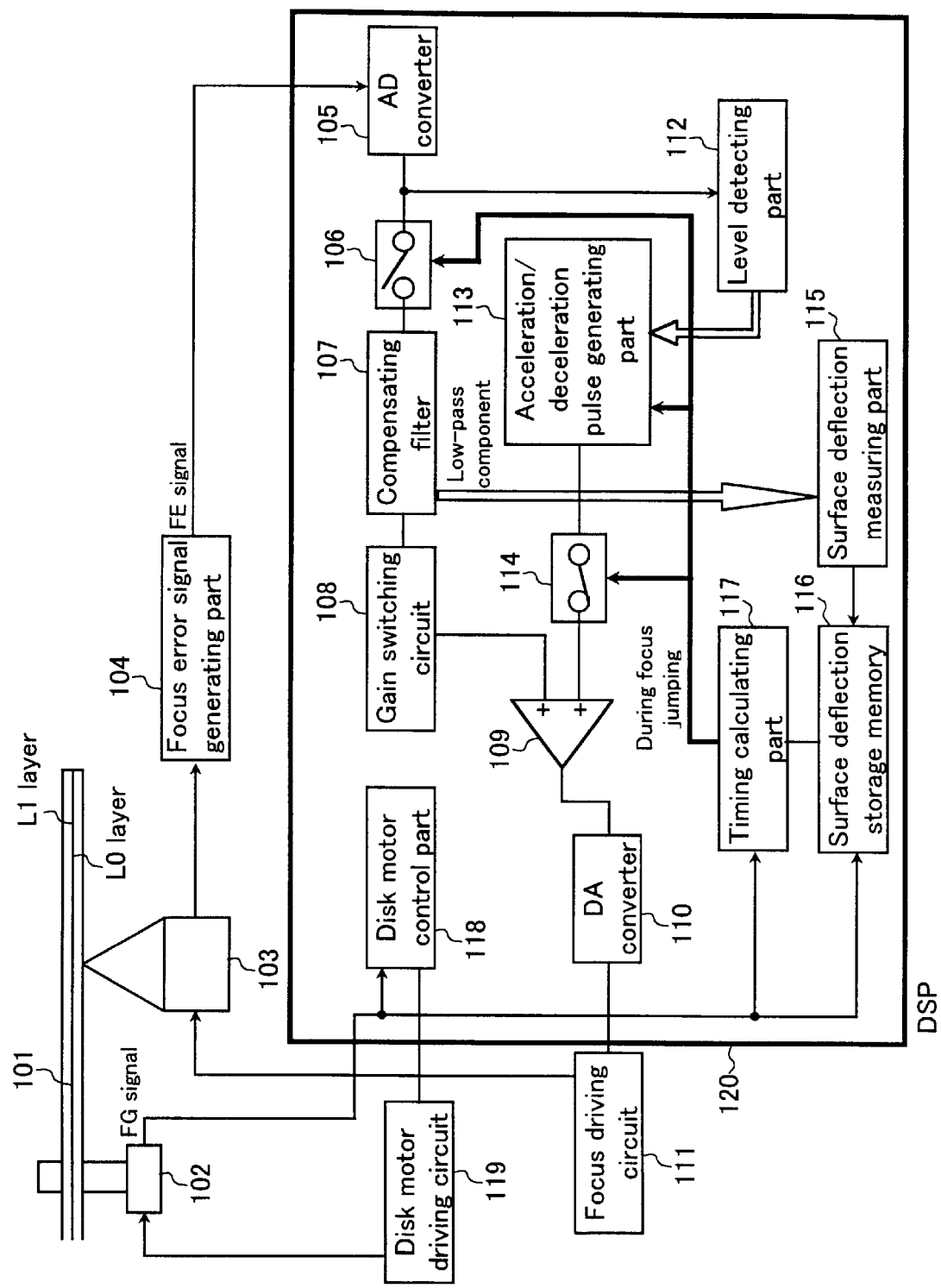
FIG. 1 is a block diagram showing a structure of an optical disk apparatus of Embodiment 1 according to the present invention.
Figure 9:
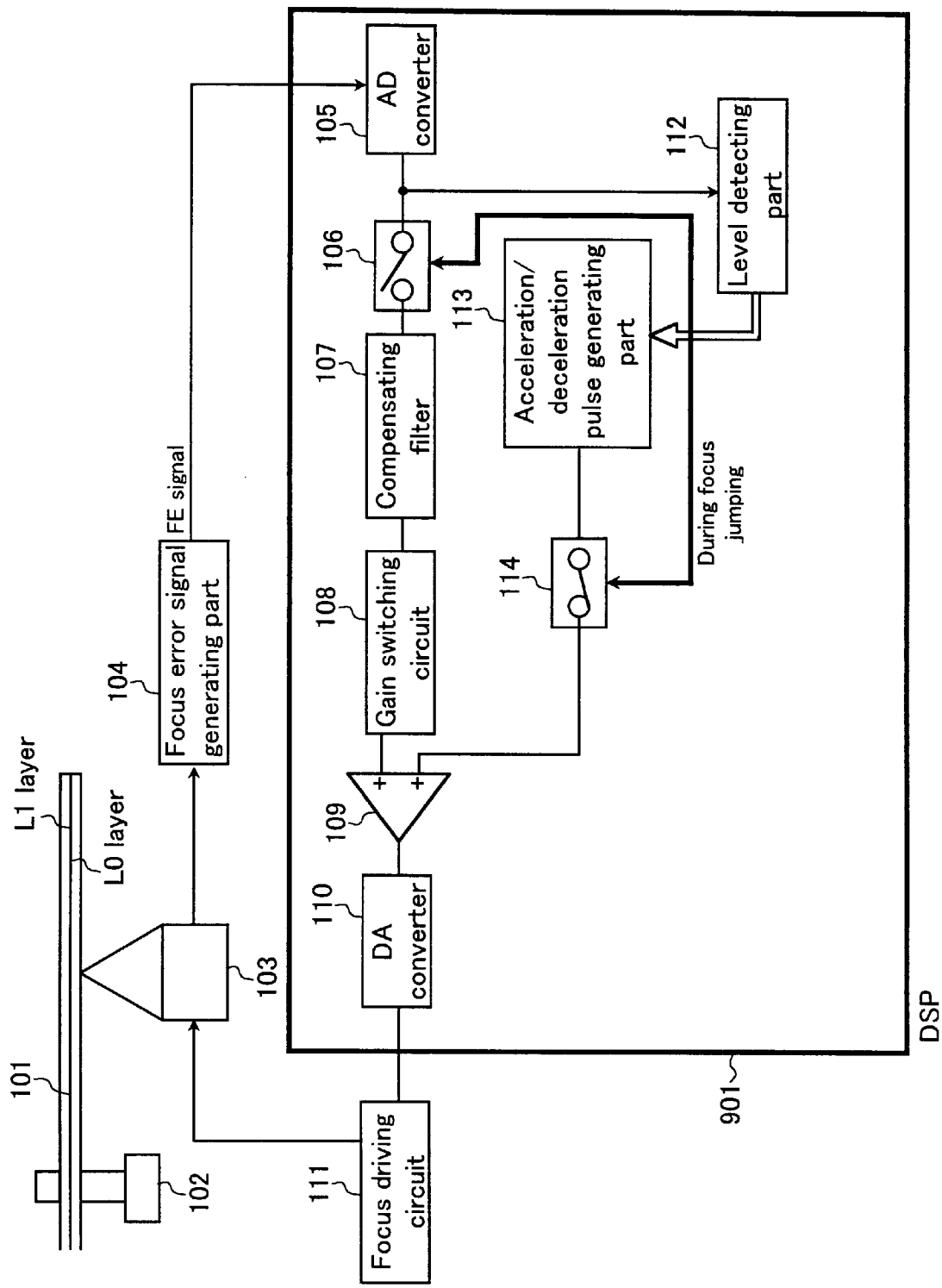
FIG. 9 is a block diagram showing a structure of a conventional optical disk apparatus.

FIG. 1 is a block diagram showing a structure of an optical disk apparatus of Embodiment 1 according to the present invention. A focus jumping method in the optical disk apparatus of Embodiment 1 is realized by adding a surface deflection measuring part 115, a surface deflection storage memory 116, a timing calculating part (herein, provided as a jumping start part and a jumping timing calculation part) 117, a disk motor control part 118, and a disk motor driving circuit 119 to a DSP (herein, provided as a focus control part) 120 in the structure of the conventional optical disk apparatus shown in FIG. 9. The same components as those in the conventional method are denoted with the same reference numerals as those therein. Therefore, the description thereof will be omitted here. In the conventional optical disk apparatus, components corresponding to the disk motor control part 118 and the disk motor driving circuit 119 also are provided. They are not related to the description of the focus jumping method directly, so that the description thereof will be omitted here.

According to the focus control, a focus actuator is driven so as to follow surface deflection of an optical disk (recording medium) 101, and a predetermined relative distance is kept between a recording/reproducing surface of the optical disk 101 and a converging lens. Therefore, the shape of surface deflection of the optical disk 101 can be determined as the position of the converging lens. Since the surface deflection of the optical disk 101 is a cyclic phenomenon that occurs at the same cycle as that of rotation of a disk motor 102, the shape of surface deflection is measured by using a positional change of the converging lens in one rotation cycle of the optical disk 101. The shape of surface deflection may be measured indirectly with a sensor provided in an optical head 103. In Embodiment 1, assuming that a certain phase in one rotation of the optical disk 101 is assumed to be time zero, the shape of surface deflection at a phase (when a predetermined number of phases proceed from time zero) will be described using a time axis by replacing the shape of surface deflection by that at time T (required for a predetermined number of phases to proceed).

The surface deflection measuring part 115 measures values of a delay circuit of a low-pass filter (composed of a delay circuit, an adder and a multiplier) for extracting a low-pass component in a compensating filter 107, and outputs measurement results to the surface deflection storage memory 116. Herein, a cut-off frequency of the low-pass filter is set at least so as to pass a rotation frequency of the optical disk 101. The surface deflection storage memory 116 stores the measurement results of the surface deflection measuring part 115 by synchronizing them with a rotation cycle of the disk motor 102, using a signal (FG signal) for measuring the rotation speed of the disk motor 102. The timing calculating part 117 calculates focus jumping start timing at which stable focus jumping is possible, by using the values of the surface deflection component (shape of surface deflection) stored in the surface deflection storage memory 116, and controls the opening/closing of switches 106, 114 and generation of a pulse in the acceleration/deceleration pulse generating part 113 during focus jumping.

Figure 2:
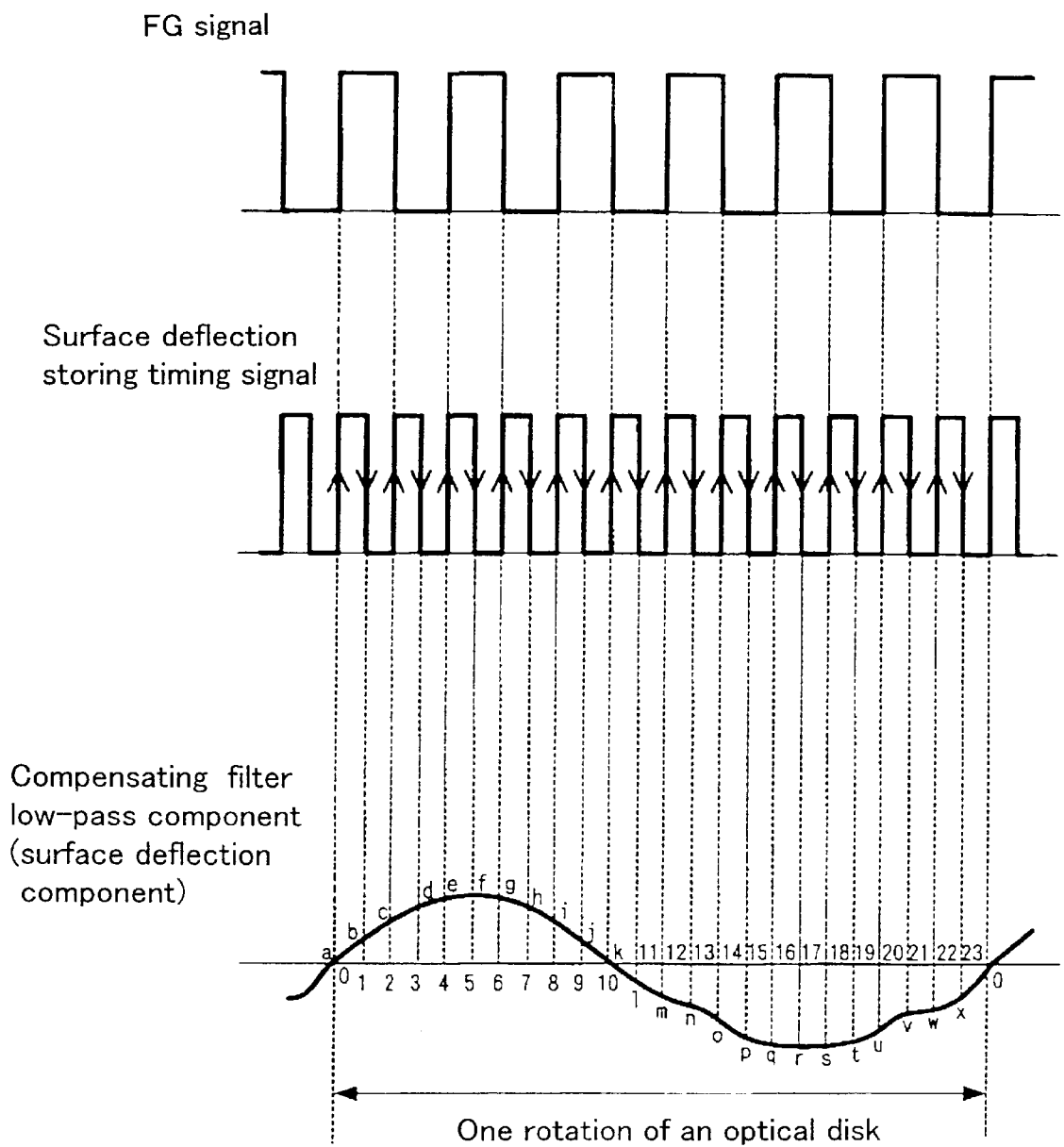
FIG. 2 is a waveform diagram for illustrating a method for storing a surface deflection component in the optical disk apparatus, showing a relationship among an FG signal, a surface deflection storage timing signal, and a compensating filter low-pass component.
Figure 3:
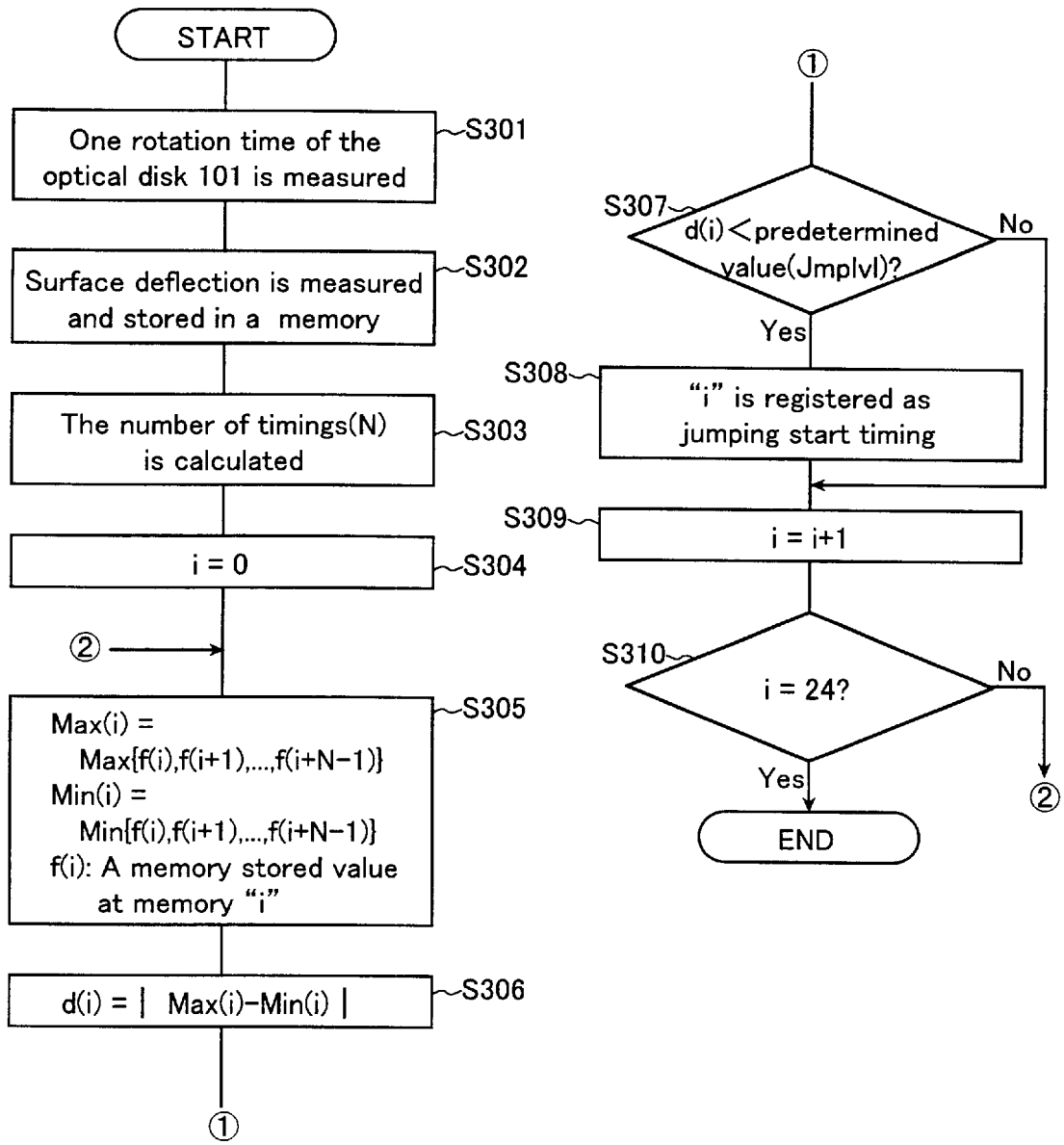
FIG. 3 is a flow chart showing an algorithm for calculating focus jumping start timing in the optical disk apparatus.
Figure 4:
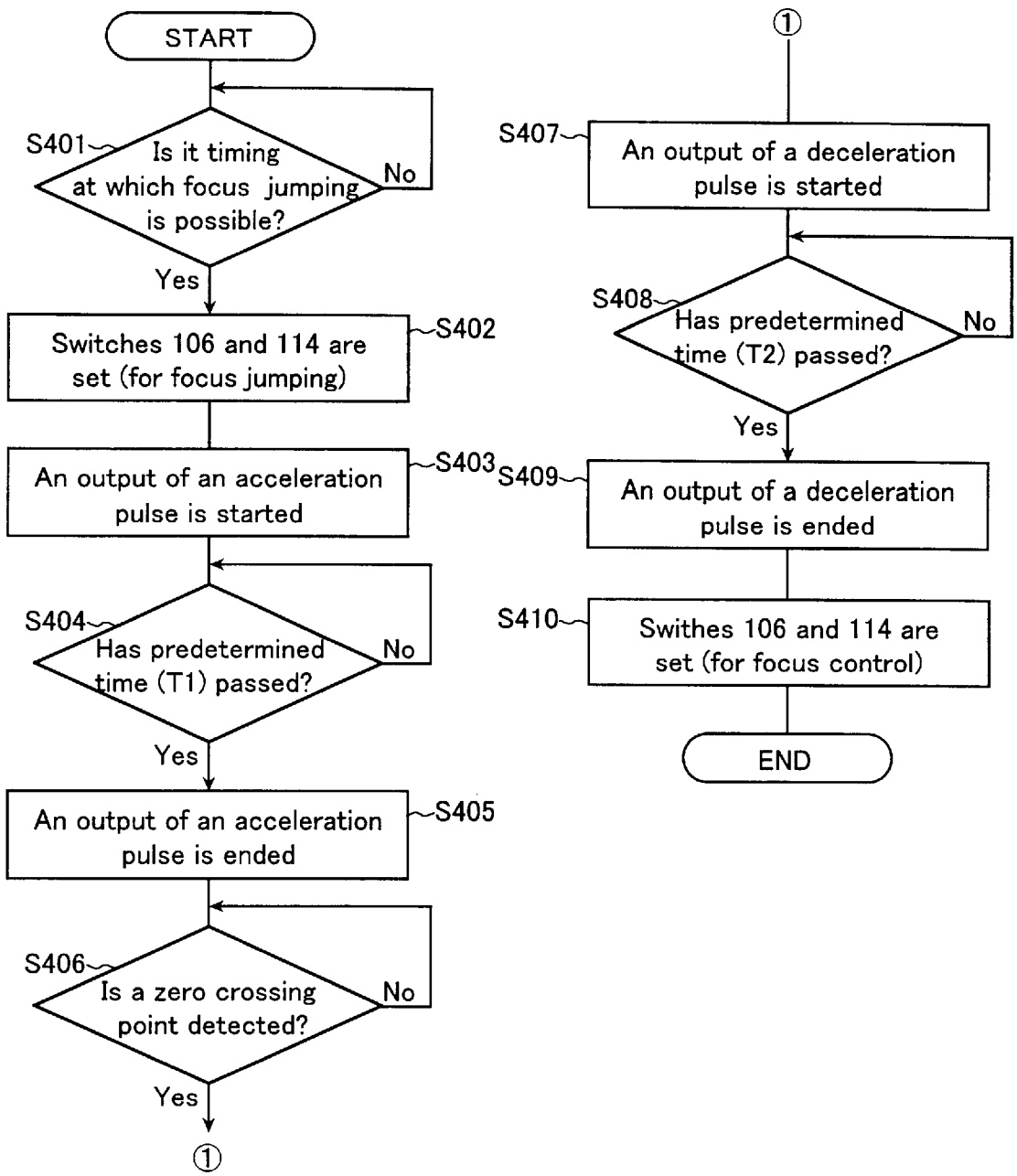
FIG. 4 is a flow chart of focus jumping processing in the optical disk apparatus.

Hereinafter, the focus jumping processing of the present embodiment will be described with reference to the waveform diagram in FIG. 2 and the flow charts in FIGS. 3 and 4, as well as the block diagram in FIG. 1. FIG. 2 illustrates a method for storing a surface deflection component in the surface deflection storage memory 116. FIG. 2 shows an FG signal, a surface deflection storage timing signal for detecting timing at which a surface deflection component of the optical disk 101 obtained by dividing the FG signal by two is stored, and output values (low-pass component) of the delay circuit of the low-pass filter in the compensating filter 107. FIG. 3 is a flow chart showing an algorithm for storing a surface deflection component in the surface deflection storage memory 116 and calculating focus jumping start timing, using the values stored in the timing calculating part 117. FIG. 4 is a flow chart showing a focus jumping processing flow in the present embodiment.

First, a method for measuring a surface deflection component of the optical disk 101 and calculating focus jumping start timing will be described with reference to the flow chart in FIG. 3.

One rotation time of the optical disk 101 is measured at Step S301. The measurement is conducted by measuring a cycle of an FG signal from the disk motor 102 in the disk motor control part 118.

Next, at Step S302, output values of the delay circuit of the low-pass filter in the compensating filter 107 are measured in the surface deflection measuring part 115, and the results thereof are stored in the surface deflection storage memory 116. The surface deflection storage memory 116 includes 24 memories, and stores the output values of the delay circuit successively from a memory 0 to a memory 23 at predetermined timing. Specifically, as shown in FIG. 2, the surface deflection storage timing signal obtained by dividing the FG signal (generated in 6 pulses in one rotation of the optical disk 101) by two is generated in the surface deflection storage memory 116, and the output values of the delay circuit of the low-pass filter are stored successively from a memory 0 on a rising and falling basis of the surface deflection storage timing signal. More specifically, assuming that timing 0 is time zero, a value "a" is stored in a memory 0 at timing 0 (time zero), and a value "b" is stored in a memory 1 at timing 1 after $1/24^{th}$ rotation time. In this manner, until a value "x" is stored in a memory 23 at timing 23 after $23/24^{th}$ rotation time, values are stored successively at intervals of $1/24^{th}$ rotation time. Herein, the interval for storage in the surface deflection memory 116 corresponds to the proceeding of a phase of $1/24^{th}$ rotation of the optical disk 101.

At Step S303, a ratio of time required for focus jumping to one rotation time is calculated based on one rotation time of the optical disk 101 measured at Step S301 and the time required for focus jumping, whereby the number of timings (N) during focus jumping in 24 timings is calculated. Herein, the time required for focus jumping is a fixed value that is set in accordance with the sensitivity of the focus actuator, energy applied to the focus actuator by an acceleration/deceleration pulse, and the like.

Next, at Step S304, a variable "i" is initialized. At Step S305, the maximum (Max (i)) and the minimum (Min (i)) of the values in the delay circuit of the low-pass filter stored from timing "i" to timing (N−1) ahead of the timing "i" are obtained. At Step S306, the difference (d(i)) between the maximum and the minimum is obtained. As an example, Max(i), Min(i), and d(i) at N=4 and i=4 become Max(4)=f, Min(4)=h, d(4)=|f−h|, since the stored value becomes maximum at timing 5 and minimum at timing 7 from timing 4 to 7 in the compensating filter low-pass component shown in FIG. 2.

At Step S307, d(i) is compared with a predetermined value (Jmplvl), and in the case where d(i) is below the predetermined value (Jmplvl), the timing "i" is set to be focus jumping start timing at Step S308. In the case where d(i) exceeds the predetermined value (Jmplvl), the timing "i" is not set to be focus jumping start timing. Next, at Step S309, the variable "i" is increased until determination is completed whether or not each timing "i" is registered as focus jumping start timing at Step S310. Herein, the calculation of focus jumping start timing corresponds to calculation for every proceeding of a phase by $1/24^{th}$ rotation of the optical disk 101.

Furthermore, the predetermined value (Jmplvl) is a fixed value that is set in accordance with the sensitivity of the focus actuator and energy applied to the focus actuator by an acceleration/deceleration pulse, and is set to be a level at which stable focus jumping is possible.

Figure 10:
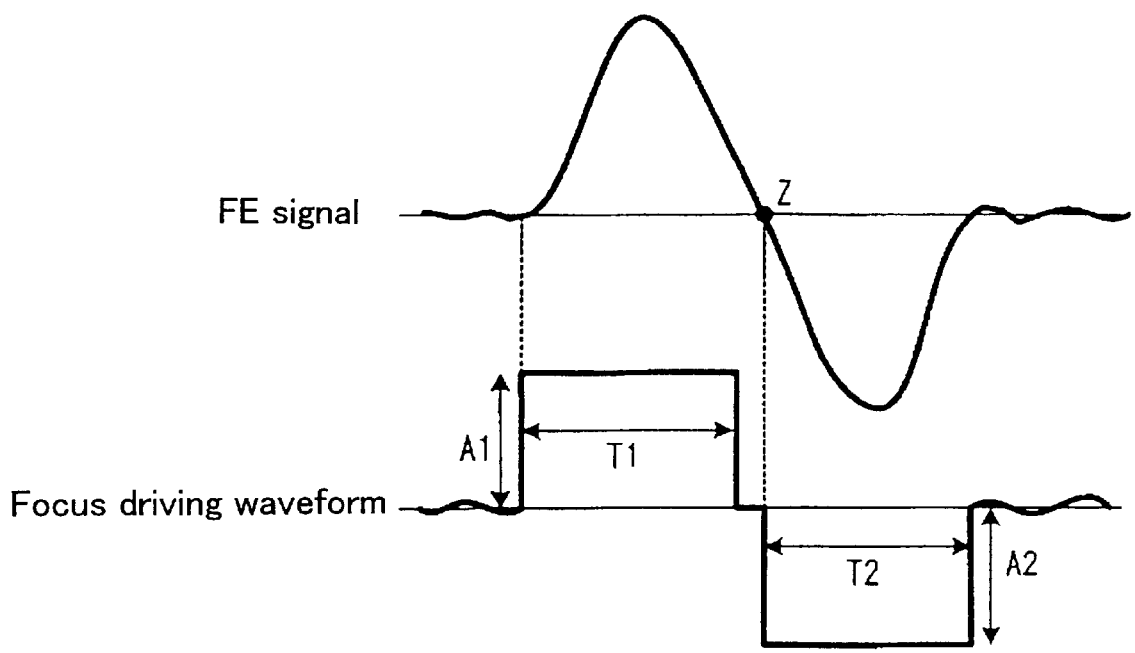
FIG. 10 is a waveform diagram showing a relationship between an FE signal and a focus driving waveform during focus jumping in the conventional optical disk apparatus.
Figure 11:
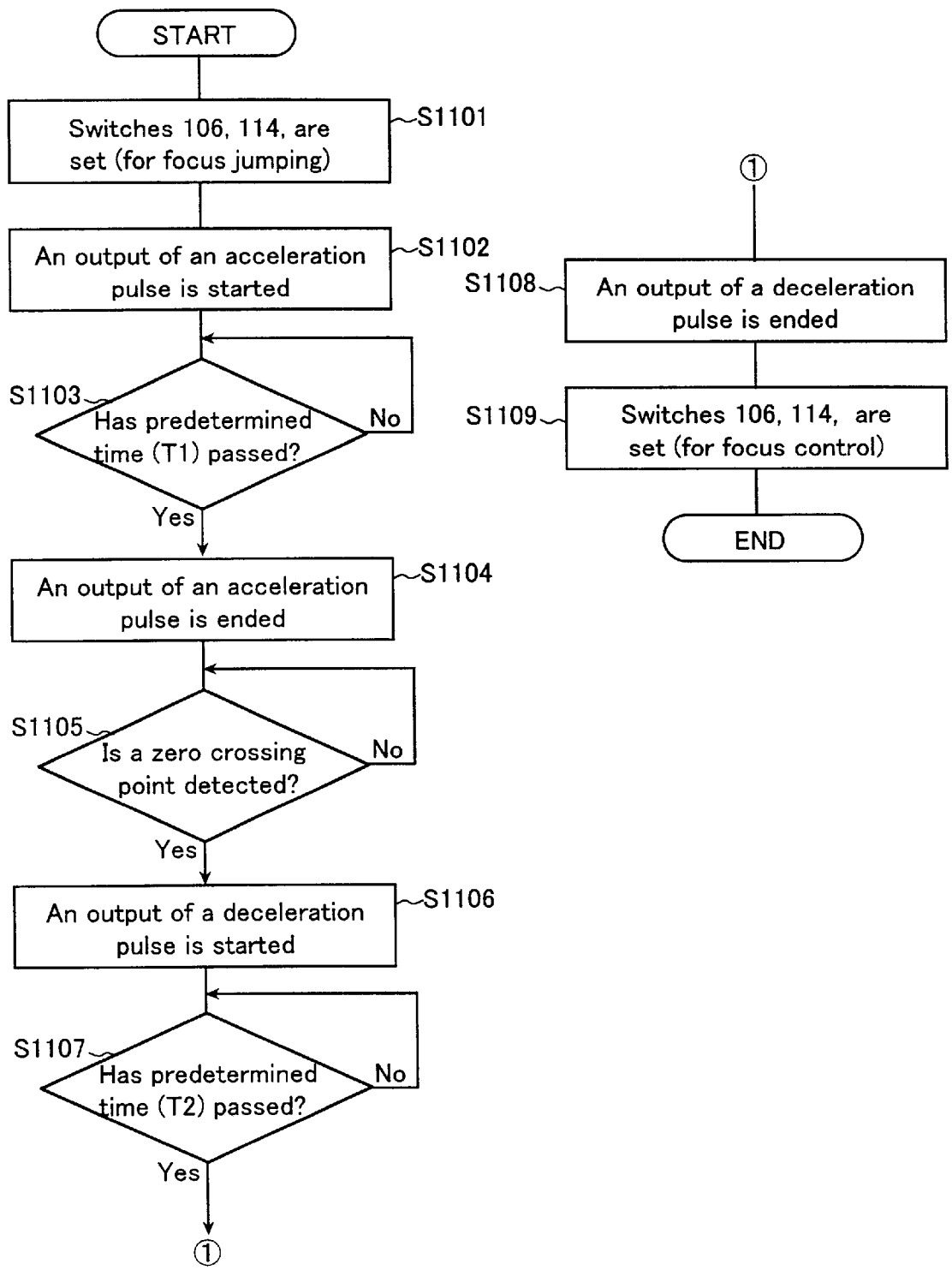
FIG. 11 is a flow chart of focus jumping processing in the conventional optical disk apparatus.

Next, the focus jumping processing from the L0 layer to the L1 layer of the optical disk 101 will be described using the focus jumping start timing calculated by the above-mentioned method with reference to the flow chart in FIG. 4 and the waveform diagram in FIG. 10.

First, at Step S401, the process waits until the rotation position of the optical disk 101 reaches the calculated focus jumping start timing in 24 timings synchronized with the rising and falling of the surface deflection storage timing signal.

Then, at Step S402, the switch 106 is turned off, and the switch 114 is turned on (set at a position for focus jumping). At Step S403, an acceleration pulse (predetermined peak value A1) starts being output. Thus, the optical head 103 starts moving toward the L1 layer of the optical disk 101, and an FE signal in a sine wave appears in accordance therewith. At Steps S404 and S405, an acceleration pulse is output for a predetermined period of time (T1). Thereafter, at Step S406, the process waits until a zero crossing point of the FE signal is detected.

Next, at Step S407, a deceleration pulse (predetermined peak value A2) starts being output. At Steps S408 and S409, a deceleration pulse is output for a predetermined period of time (T2). Thereafter, at Step S410, the switch 106 is turned on, and the switch 114 is turned off (set at a position for focus control). Thus, focus jumping to another recording/reproducing surface (e.g., from the L0 layer to the L1 layer) is completed, and focus control is restarted. In the present embodiment, each component operated when the switch 106 is turned off, and the switch 114 is turned on (set at a position for focus jumping) constitutes a focus jumping part.

Herein, in the case where surface deflection of the optical disk 101 hardly occurs, and the difference between the maximum and the minimum of the delay circuit of the low-pass filter in a predetermined time is below the predetermined value (Jmplvl) at all the timings in the calculation of the focus jumping start timing, it is determined that focus jumping can be conducted stably even if it is started at any timing. Therefore, the process is not required to wait until the rotation position of the optical disk 101 reaches the focus jumping start timing at Step S401. Focus jumping is conducted at any timing without being synchronized with 24 timings in one rotation of the optical disk 101.

In the case where the identical optical disk 101 is used and rotated at a constant rotation speed, calculation of the focus jumping start timing should be conducted only once before focus jumping is conducted for the first time after activation of the apparatus. Furthermore, focus jumping start timing may be calculated respectively, for example, in the vicinity of an inner periphery and an outer periphery in accordance with a radius position of the optical disk 101, and the focus jumping start timing may be switched in accordance with the intended track during a search.

Furthermore, when the rotation speed (a rotation number) is changed, a centrifugal force to be generated also is changed. Therefore, the surface deflection at a certain phase in one rotation cycle of the optical disk 101 is changed. Accordingly, by calculating focus jumping start timing for each of different reproduction rotation speeds of the optical disk 101 and starting focus jumping while switching timing in accordance with a reproduction rotation speed, stable focus jumping can be realized at an optimum timing at each reproduction rotation speed.

As described above, by storing output values of the delay circuit of the low-pass filter in the compensating filter 107, calculating the timing at which a change in the output values of the delay circuit is the predetermined value (Jmplvl) or less in the time required for focus jumping, and starting focus jumping at the calculated timing, stable focus jumping can be realized even during high-speed reproduction.

In the present embodiment, one rotation of the optical disk is divided by 24, and the output values of the delay circuit of the low-pass filter at the respective timings are stored in 24 memories. However, there is no particular limit as long as the division number is set so that at least two output values of the delay circuit are stored in the time required for focus jumping. Furthermore, in the present embodiment, the output values of the delay circuit of the low-pass filter in the compensating filter 107 are used for measuring a surface deflection component. However, the same effects can be obtained even when the values of the FE signal passing through the AD converter 105 are stored in the surface deflection storage memory 116 on a rising and falling basis of the surface storage timing signal.

Furthermore, a differentiator is provided in the DSP 120, whereby the output signal from the low-pass filter in the compensating filter 107 or the FE signal passing through the AD converter 105 is differentiated, and an acceleration of a surface deflection component of the optical disk 101 is calculated. The same effects as those described above can be obtained by storing the acceleration of a surface deflection component that is an output signal of the differentiator, calculating the timing at which a change in the acceleration in time required for focus jumping is a predetermined value or less, and starting focus jumping at the calculated timing.

In the present embodiment, a surface deflection component at a certain time has been described using a time axis, assuming that a certain phase in one rotation of the optical disk 101 is time zero. However, the description of the surface deflection component is not particularly limited to a time axis. The output values of the delay circuit of the low-pass filter in the compensating filter 107 or the values of the FE signal passing through the AD converter 105 are used for measuring a surface deflection component, and the values are stored in the surface deflection storage memory 116 on a rising and falling basis of the surface deflection storage timing signal, obtained by dividing one rotation of the optical disk 101 on a predetermined phase basis. A phase at which the difference between the maximum and the minimum of the stored values between predetermined phases is a predetermined value or less is calculated, and focus jumping is started at the calculated phase. Thus, stable focus jumping can be realized without being influenced by a time concept.

Embodiment 2

Figure 5:
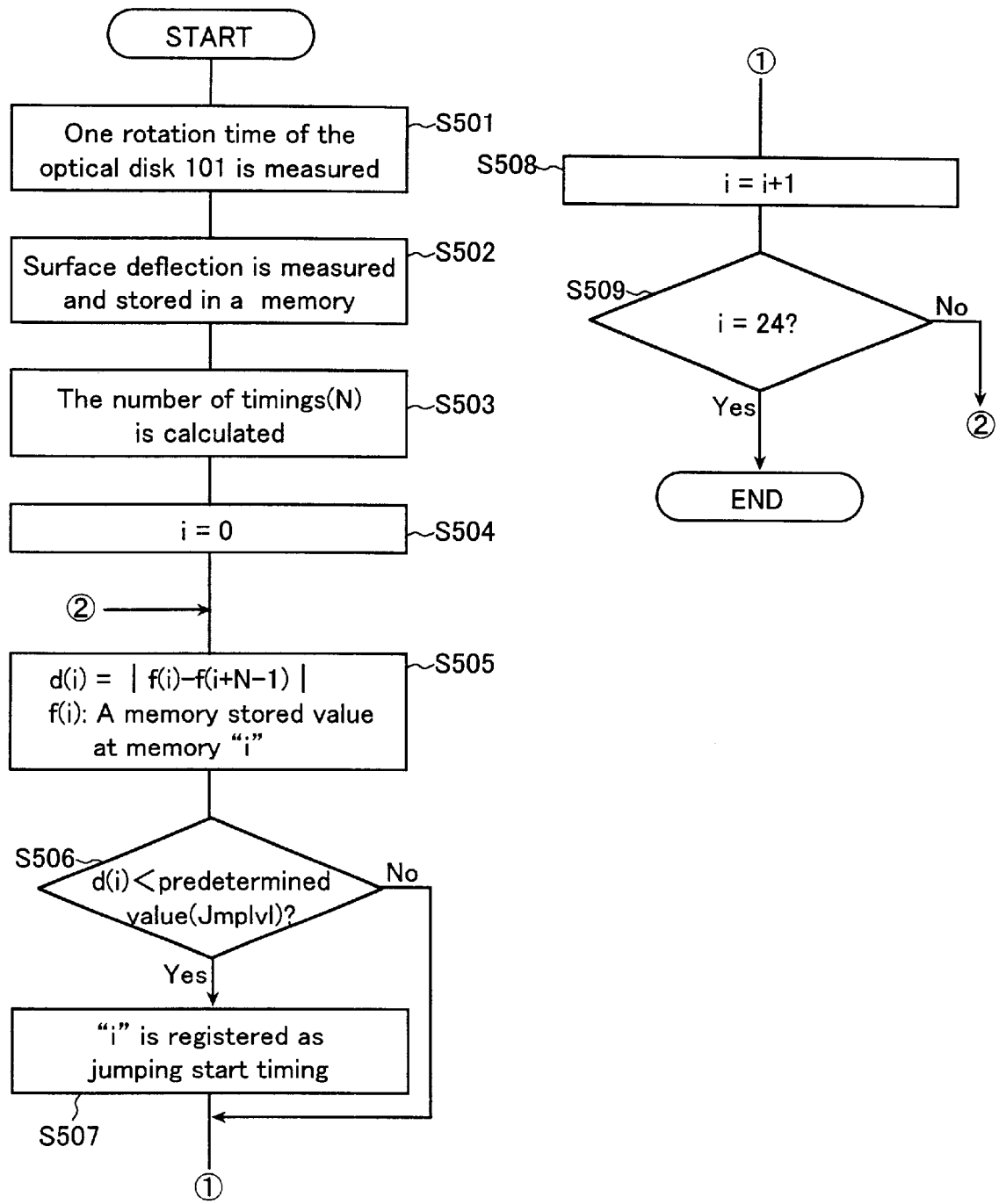
FIG. 5 is a flow chart showing an algorithm for calculating focus jumping start timing in an optical disk apparatus of Embodiment 2 according to the present invention.

Hereinafter, Embodiment 2 of the present invention will be described. The structure of the optical disk apparatus of the present embodiment is the same as that of Embodiment 1 shown in FIG. 1. This structure can be realized by altering the calculation algorithm of focus jumping start timing in the timing calculating part 117. Hereinafter, the focus jumping start timing calculation algorithm in the present embodiment will be described with reference to a flow chart in FIG. 5 as well as the block diagram in FIG. 1.

First, at Step S501, a surface deflection component of the optical disk 101 is measured. At Step S502, the measurement results are stored in the surface deflection storage memory 116. At Step S503, the number of timings (N) during focus jumping in 24 timings synchronized with rising and falling of the surface deflection storage timing signal is calculated. Thereafter, at Step S504, a variable "i" is initialized. This processing is the same as that described in Embodiment 1. Therefore, the description thereof will be omitted.

Next, at Step S505, the difference (d(i)) in output values of the delay circuit of the low-pass filter at timing "i" and at timing (N−1) ahead of the timing "i" is obtained, which is caused by the influence of surface deflection of the optical disk 101. As an example, d(4) at N=4 and i=4 is |e−h|, since the stored value at timing 4 is e and the stored value at timing 7 is h in a low-pass component of the compensating filter in FIG. 2.

At Step S506, d(i) is compared with a predetermined value (Jmplvl), and in the case where d(i) is below the predetermined value (Jmplvl), the timing "i" is registered as focus jumping start timing at Step S507. In the case where d(i) exceeds the predetermined value (Jmplvl), the timing "i" is not registered as focus jumping start timing.

Next, at Step S508, the variable "i" is increased until determination is completed whether or not each timing "i" is registered as focus jumping start timing at Step S509. Herein, the calculation of focus jumping start timing corresponds to calculation for every proceeding of a phase by $1/24^{th}$ rotation of the optical disk 101.

Furthermore, the predetermined value (Jmplvl) is a fixed value that is set in accordance with the sensitivity of the focus actuator and energy applied to the focus actuator by an acceleration/deceleration pulse, and is set to be a level at which stable focus jumping is possible.

Next, the focus jumping processing from the L0 layer to the L1 layer of the optical disk 101 using the focus jumping start timing calculated by the above-mentioned method is the same as that in Embodiment 1. Therefore, the description thereof will be omitted here.

Herein, in the same way as in Embodiment 1, in the case where surface deflection of the optical disk 101 hardly occurs, and the difference in output values of the delay circuit of the low-pass filter between a certain timing and a timing ahead of the certain timing by predetermined timings is below the predetermined value (Jmplvl) at all the timings in the calculation of the focus jumping start timing, it is determined that focus jumping can be conducted stably even if it is started at any timing. Therefore, the process is not required to wait until the rotation position of the optical disk 101 reaches the focus jumping start timing at Step S501. Focus jumping is conducted at any timing without being synchronized with 24 timings in one rotation of the optical disk 101.

In the case where the identical optical disk 101 is used and rotated at a constant rotation speed, calculation of the focus jumping start timing should be conducted only once before focus jumping is conducted for the first time after activation of the apparatus. Furthermore, focus jumping start timing may be calculated respectively, for example, in the vicinity of an inner periphery and an outer periphery in accordance with a radius position of the optical disk 101, and the focus jumping start timing may be switched in accordance with the intended track during a search.

Furthermore, when the rotation speed (rotation number) is changed, a centrifugal force to be generated also is changed. Therefore, the surface deflection at a certain phase in one rotation cycle of the optical disk 101 is changed. Accordingly, by calculating focus jumping start timing for each of different reproduction rotation speeds of the optical disk 101 and starting focus jumping while switching timing in accordance with a reproduction rotation speed, stable focus jumping can be realized at an optimum timing at each reproduction rotation speed.

As described above, by storing output values of the delay circuit of the low-pass filter in the compensating filter 107, calculating the timing at which the difference between the stored values at the beginning of focus jumping and at the end of focus jumping is the predetermined value (Jmplvl) or less, and starting focus jumping at the calculated timing, stable focus jumping can be realized even during high-speed reproduction.

In the present embodiment, in the same way as in Embodiment 1, one rotation of the optical disk is divided by 24, and the output values of the delay circuit of the low-pass filter at the respective timings are stored in 24 memories. However, there is no particular limit as long as the division number is set so that at least two output values of the delay circuit are stored in the time required for focus jumping. Furthermore, in the present embodiment, the output values of the delay circuit of the low-pass filter in the compensating filter 107 are used for measuring a surface deflection component. However, the same effects can be obtained even when the values of the FE signal passing through the AD converter 105 are stored in the surface deflection storage memory 116 on a rising and falling basis of the surface storage timing signal. Furthermore, even in the case where the output signal from the low-pass filter or the FE signal is differentiated, and an acceleration of a surface deflection component of the optical disk 101 is used, the same effects can be obtained. The detailed structure thereof is the same as that described in Embodiment 1. Therefore, the description thereof will be omitted here.

In the same way as in Embodiment 1, a surface deflection component at a certain time has been described using a time axis, assuming that a certain phase in one rotation of the optical disk 101 is time zero. However, the description of the surface deflection component is not particularly limited to a time axis, as described above. The output values of the delay circuit of the low-pass filter in the compensating filter 107 or the values of the FE signal passing through the AD converter 105 are used for measuring a surface deflection component, and the values are stored in the surface deflection storage memory 116 on a rising and falling basis of the surface deflection storage timing signal, obtained by dividing one rotation of the optical disk 101 on a predetermined phase basis. A phase at which the difference between the stored value at a certain phase and the stored value at a phase ahead of the certain phase by predetermined phases is a predetermined value or less is calculated, and focus jumping is started at the calculated phase. Thus, stable focus jumping can be realized without being influenced by a time concept.

Embodiment 3

Figure 6:
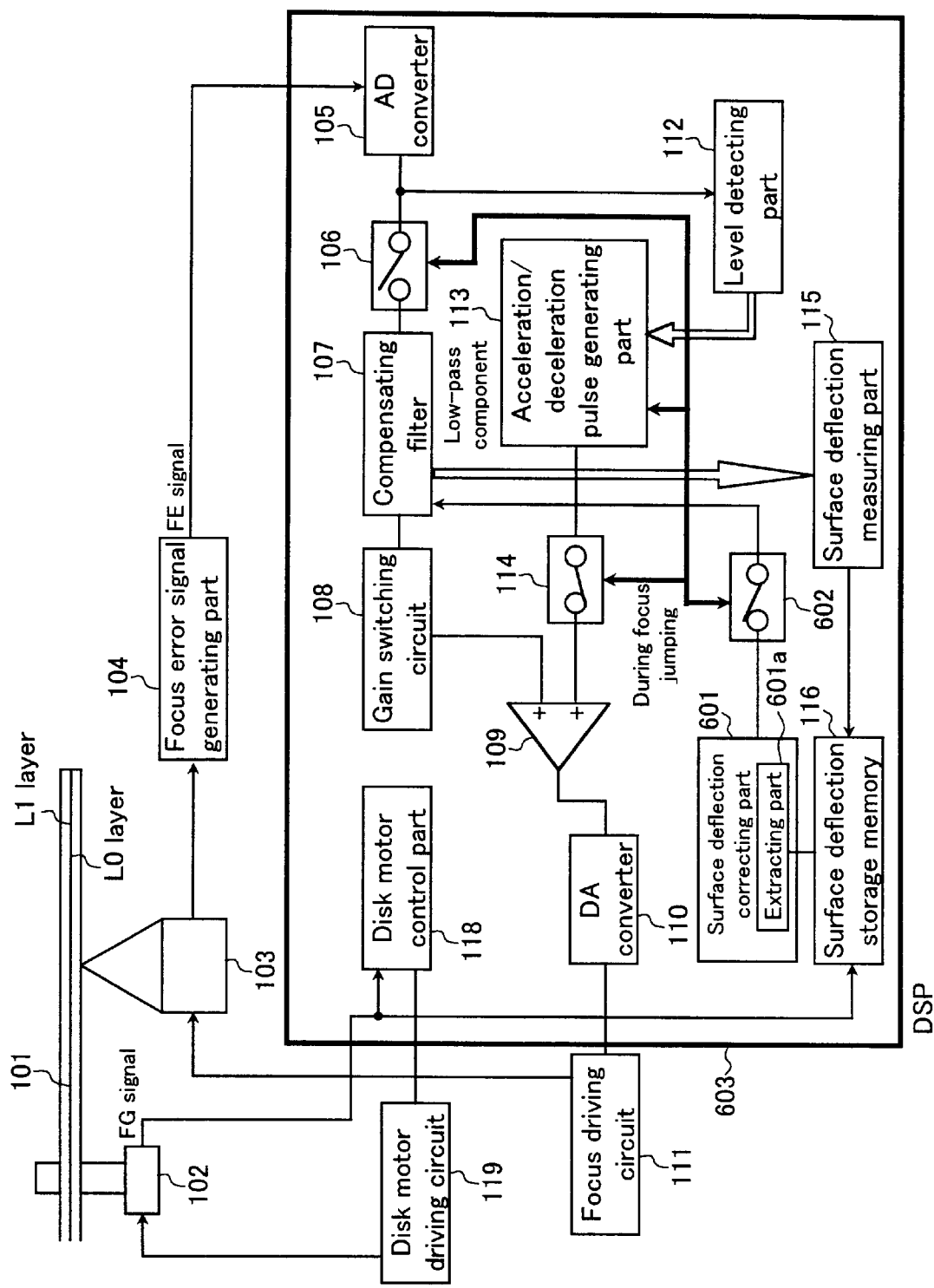
FIG. 6 is a block diagram showing a structure of an optical disk apparatus of Embodiment 3 according to the present invention.

Hereinafter, Embodiment 3 of the present invention will be described. FIG. 6 is a block diagram showing a structure of an optical disk apparatus of Embodiment 3 according to the present invention. The optical disk apparatus of the present embodiment can be realized by, with respect to the structure described in Embodiment 1 shown in FIG. 1, deleting the timing calculating part 117 and adding a surface deflection correcting part 601 for correcting a positional change in a surface deflection component due to the influence of surface deflection during focus jumping, based on the stored values in the surface deflection storage memory 116 and a switch 602 for inputting the output signal from the surface deflection correcting part 601 to the compensating filter 107 only during focus jumping. Herein, the components corresponding to those in Embodiment 1 are denoted with the same reference numerals as those therein. Therefore, the description thereof will be omitted here.

Figure 7:
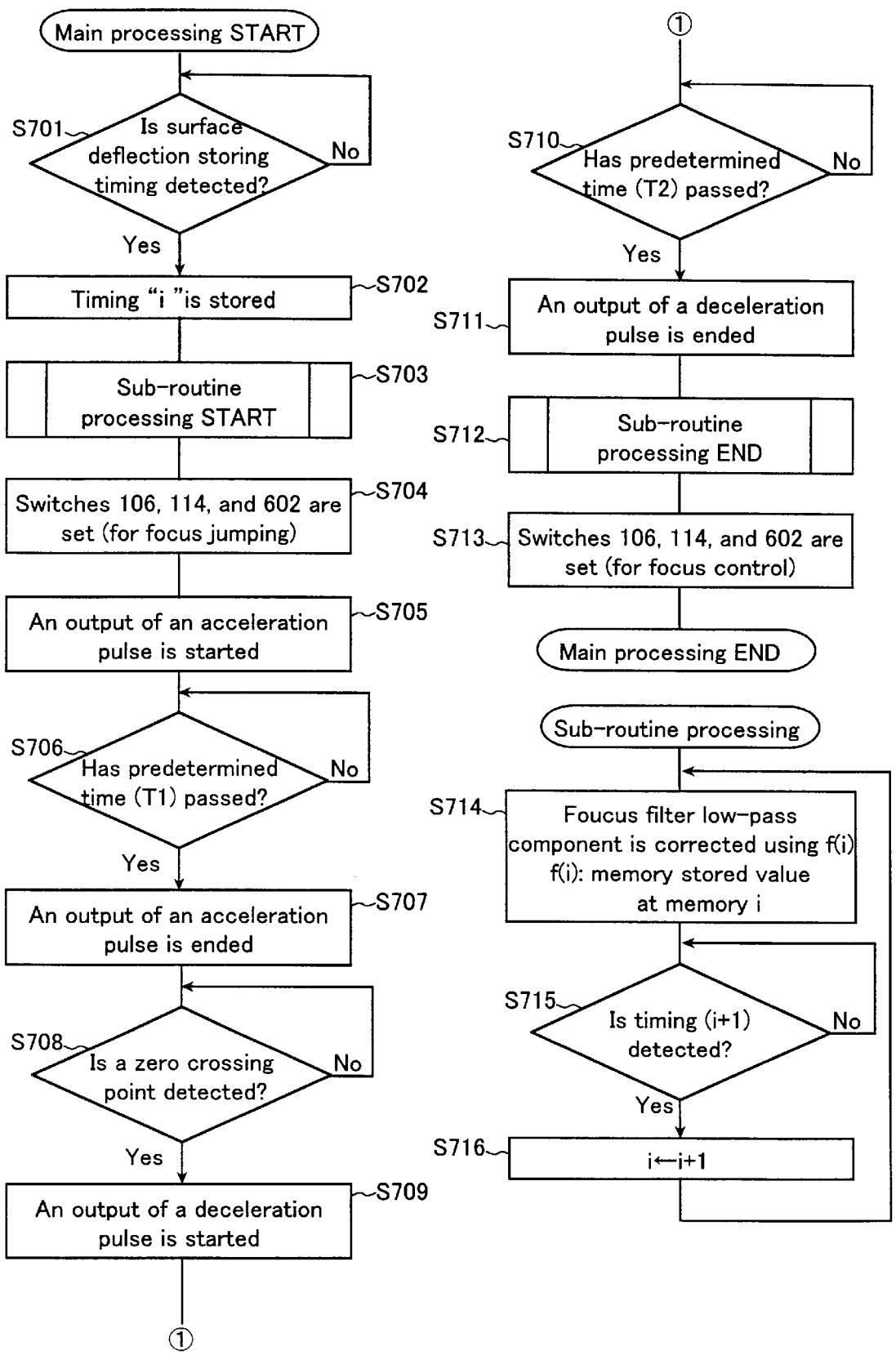
FIG. 7 is a flow chart of focus jumping processing in the optical disk apparatus.

Hereinafter, the focus jumping processing from the L0 layer to the L1 layer, as well as a correction method in the present embodiment will be described in detail with reference to the flow chart in FIG. 7, the waveform diagrams in FIGS. 2 and 10, as well as the block diagram in FIG. 6. A method for measuring a surface deflection component of the optical disk 101 and storing the measured component in the surface deflection storage memory 116 (that functions as a surface deflection storing part) is the same as that in Embodiments 1 and 2. Therefore, the description thereof will be omitted here. In the present embodiment, it is assumed that a surface deflection component of the optical disk 101 is stored.

First, at Step S701, the process waits until an arbitrary edge of rising or falling of the surface deflection storage timing signal shown in FIG. 2 is detected. In the present embodiment, since one rotation of the optical disk 101 is divided by 24, the process waits for at most $\frac{1}{24}^{th}$ hour of one rotation. Next, at Step S702, timing "i" with respect to the detected edge is stored. At Step S703, sub-routine processing is started for correcting a change in a surface deflection component in focus jumping. The sub-routine processing will be described later.

The main processing is as follows. At Step S704, the switch 106 is turned off, and the switches 114 and 602 are turned on (set at a position for focus jumping). At Step S705, when an acceleration pulse (predetermined peak value A1) starts being output, the optical head 103 starts moving toward the L1 layer of the optical disk 101, and an FE signal in a sine wave appears in accordance therewith. At Steps S706 and S707, an acceleration pulse is output for a predetermined period of time (T1), and at Step S708, the process waits until a zero crossing point of the FE signal is detected.

Next, at Step S709, a deceleration pulse (predetermined peak value A2) starts being output. At Steps S710 and S711, a deceleration pulse is output for a predetermined period of time (T2). Thereafter, at Step S712, sub-routine processing is completed. Then, at Step S713, the switch 106 is turned on, and the switches 114 and 602 are turned off (set at a position for focus control). Thus, focus jumping to another recording/reproducing surface (e.g. from the L0 layer to the L1 layer) is completed, and focus control is restarted. In the present embodiment, each component operated when the switch 106 is turned off, and the switches 114 and 602 are turned on (set at a position for focus jumping) constitutes a focus jumping part.

Next, sub-routine processing will be described. At Step S714, the surface deflection correcting part 601 reads a memory stored value f(i) at the stored timing "i" from the surface deflection storage memory 116, using an extracting part 601a, and updates the values in the delay circuit of the low-pass filter in the compensating filter 107, using the stored value f(i). The compensating filter 107 functions as a converging position holding part. During focus jumping, the switch 106 is turned off, and the switch 602 is turned on. Therefore, an acceleration/deceleration pulse is applied to a component holding the memory storage value f(i). While an acceleration pulse and a deceleration pulse are output in the main processing, when the subsequent edge (timing "i+1") of the surface deflection storage timing signal is detected at Step S715, the surface deflection correcting part 601 updates "i" at Step S716. The process returns to Step S714.

As an example, assuming that focus jumping is started from timing i=5, as is understood from FIG. 2, first, output values of the delay circuit of the low-pass filter in the compensating filter 107 are updated by using the memory stored value f(5)=f When the optical disk 101 is rotated by $\frac{1}{24}^{th}$ after the start of jumping, timing 6 is detected.

Therefore, the values are updated by using a memory stored value f(6)=g. In this manner, every time the timing is detected, the output values of the delay circuit of the low-pass filter in the compensating filter 107 can be updated by using the memory stored value. Because of this, by conducting focus jumping while holding a surface deflection component at the beginning of focus jumping, the difference between the position the light beam reaches at the end of jumping and the surface deflection position can be reduced, and stable focus jumping can be realized.

Furthermore, in the present embodiment, in the same way as in Embodiments 1 and 2, a surface deflection component at a certain time has been described using a time axis, assuming that a certain phase in one rotation of the optical disk 101 is time zero. However, the description of the surface deflection component is not particularly limited to a time axis. The output values of the delay circuit of the low-pass filter in the compensating filter 107 or the values of the FE signal passing through the AD converter 105 are used for measuring a surface deflection component, and the values are stored in the surface deflection storage memory 116 on a rising and falling basis of the surface deflection storage timing signal, obtained by dividing one rotation of the optical disk 101 on a predetermined phase basis.

As described above, the output values of the delay circuit of the low-pass filter in the compensating filter 107 are updated by using a memory stored value with some gain added thereto, every time a predetermined number of phases proceed during focus jumping in the surface deflection correcting part 601. Because of this structure, stable focus jumping can be realized without being influenced by a time concept. In the case of using the output values of the delay circuit of the low-pass filter in the compensating filter 107 for measuring a surface deflection component, the gain in the surface deflection correcting part 601 becomes 1.

Embodiment 4

Hereinafter, Embodiment 4 of the present invention will be described. The structure of an optical disk apparatus of the present embodiment is the same as that described in Embodiment 3 shown in FIG. 6. This structure can be realized by altering a correction method in the surface deflection correcting part 601.

Figure 8:
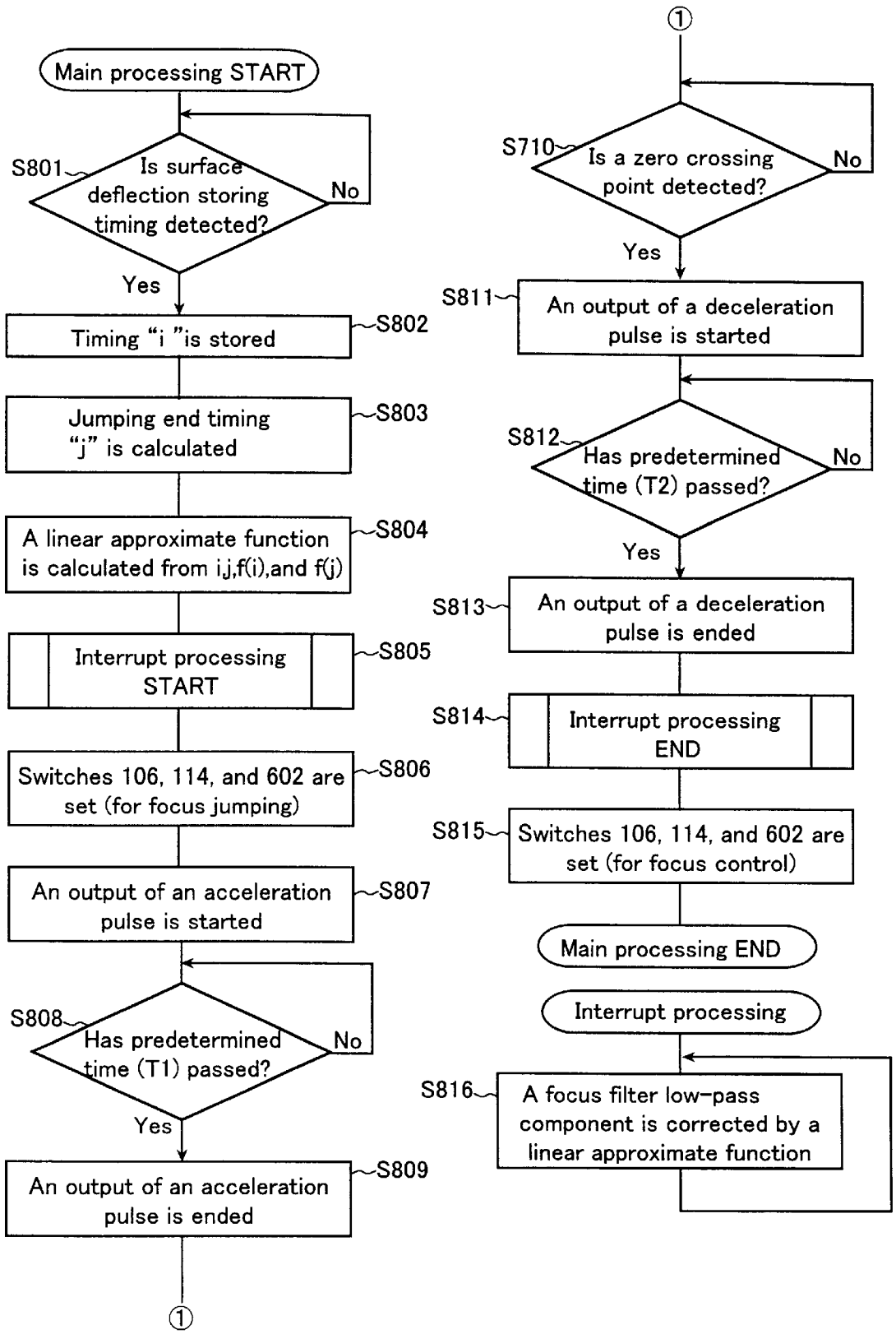
FIG. 8 is a flow chart of focus jumping processing in an optical disk apparatus of Embodiment 4 according to the present invention.

The focus jumping processing from the L0 layer to the L1 layer, as well as the correction method in the present embodiment, will be described in detail with reference to the flow chart in FIG. 8 and the waveform diagram in FIG. 2, as well as the block diagram in FIG. 6. In the same way as in Embodiment 3, a method for measuring a surface deflection component of the optical disk 101 and storing the measured component in the surface deflection storage memory 116 is the same as that in Embodiments 1 and 2. Therefore, the description thereof will be omitted here. In the present embodiment, it is assumed that a surface deflection component of the optical disk 101 is stored.

First, at Step S801, the process waits until an arbitrary edge of rising or falling of the surface deflection storage timing signal shown in FIG. 2 is detected. In the present embodiment, since one rotation of the optical disk 101 is divided by 24, the process waits for at most $1/24^{th}$ hour of one rotation. Next, at Step S802, timing "i" with respect to the detected edge is stored. At Step S803, timing j which may be attained at the end of focus jumping is calculated based on one rotation time of the optical disk 101 and the time required for focus jumping. As an example, assuming that the time required for focus jumping is $3/24^{th}$ of one rotation time, and timing i=4, j becomes 7.

Then, at Step S804, using focus jumping start timing i and end timing j extracted in the extracting part 601a, a stored value f(i) with respect to timing i and a stored value f(j) with respect to timing j in the surface deflection storage memory 116, the surface deflection correcting part 601 calculates a linear approximate function that represents a change in a surface deflection component during focus jumping.

Herein, assuming that a change in a surface deflection component is y, and time required for focus jumping is T, the change y in a surface deflection component at time t ($0 \leq t \leq T$) during focus jumping is represented by the following formula:

$$y = \{(f(j)-f(i))/T\} \times t + f(i)$$

Thereafter, at Step S805, interrupt processing for correcting a change in a surface deflection component during focus jumping, using the above-mentioned formula, is started. According to the interrupt processing, at Step S816, a surface deflection component is calculated by using the above-mentioned formula on a predetermined interrupt time basis, and the output values of the delay circuit of the low-pass filter in the compensating filter 107 are updated.

Regarding the main processing, processing from setting of switches at Step S806 to the end of an output of a deceleration pulse at Step S813 is the same as that in Embodiment 3. Therefore, the description thereof will be omitted here. After a deceleration pulse is output, the interrupt processing is completed at Step S814. Thereafter, at Step S815, the switch 106 is turned on, and the switches 114 and 602 are turned off (set at a position for focus control). Thus, focus jumping to another recording/reproducing surface (e.g., from the L0 layer to the L1 layer) is completed, and focus control is restarted.

As described above, surface deflection during focus jumping is linearly interpolated by using the output values of the delay circuit of the low-pass filter at the beginning of focus jumping and the values thereof at the end of focus jumping, whereby the output values of the delay circuit of the low-pass filter in the compensating filter 107 are successively updated. Thus, the difference between the position the light beam reaches at the end of jumping and the surface deflection position, caused by conducting jumping while holding a surface deflection component at the beginning of focus jumping, can be reduced, and stable focus jumping can be realized.

Furthermore, in the present embodiment, a surface deflection component has been described using a time axis. However, by defining a linear approximate function with a phase in a rotation cycle of the optical disk 101, the description is not required to be limited to a time axis.

As described above, according to the present invention, an optical disk apparatus capable of conducting high-speed reproduction with stable focus jumping performance can be provided by storing a surface deflection component in one rotation of an optical disk and starting focus jumping in the case where the positional change of a surface deflection component during focus jumping to another recording/reproducing surface is a predetermined value or less.

Furthermore, an optical disk apparatus capable of conducting high-speed reproduction with stable focus jumping performance can be provided by storing a surface deflection component in one rotation of an optical disk and updating the surface deflection component held at the beginning of jumping during focus jumping, using the stored values.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical disk apparatus, comprising:
    a moving part for moving a converged point of a light beam converged on a recording medium having a plurality of stacked recording/reproducing surfaces in a direction substantially vertical to the recording/reproducing surfaces;
    a converged state detecting part for generating a signal corresponding to a converged state of the light beam on the recording medium;
    a focus control part for driving the moving part in accordance with a focus error signal that is an output signal from the converged state detecting part, in such a manner that the light beam is converged at a substantially constant position on the recording medium;
    a focus jumping part for moving the converged point of the light beam from an arbitrary recording/reproducing surface of the recording medium to another recording/reproducing surface thereof;
    a surface deflection measuring part for measuring a shape of surface deflection of the recording medium; and
    a jumping starting part for operating the focus jumping part based on measurement results of the surface deflection measuring part.

2. An optical disk apparatus according to claim 1, wherein the surface deflection measuring part measures a shape of surface deflection that is a cyclic phenomenon synchronized with a rotation cycle of the recording medium on a predetermined phase basis, and
    the jumping starting part operates the focus jumping part in a case where a difference between a maximum value and a minimum value of the shape of surface deflection of the recording medium between two arbitrary phases is a predetermined value or less.

3. An optical disk apparatus according to claim 2, wherein the jumping starting part operates the focus jumping part at an arbitrary phase in a case where a difference between a maximum value and a minimum value of a shape of surface deflection in one rotation of the recording medium is a predetermined value or less.

4. An optical disk apparatus according to claim 2, wherein the jumping starting part determines a phase at which the focus jumping part is operated, based on the measurement results of the surface deflection measuring part, only at a time of focus jumping conducted for the first time after activation of the apparatus, and subsequently operates the focus jumping part at the same phase in a case where the same recording medium is used at the same rotation speed.

5. An optical disk apparatus according to claim 2, wherein the surface deflection measuring part measures a shape of surface deflection for each of different rotation speeds of the recording medium, and
    the jumping starting part determines and stores a phase at which the focus jumping part is operated, for each of different rotation speeds of the recording medium based on the measurement results of the surface deflection measuring part, and switches the phase at which the focus jumping part is operated in accordance with the rotation speed of the recording medium.

6. An optical disk apparatus according to claim 1, wherein the surface deflection measuring part measures a shape of surface deflection that is a cyclic phenomenon synchronized with a rotation cycle of the recording medium on a predetermined phase basis, and
    the jumping starting part operates the focus jumping part in a case where a difference between a shape of surface deflection of the recording medium at an arbitrary phase and a shape of surface deflection of the recording medium at a phase ahead of the arbitrary phase by a predetermined number of phases.

7. An optical disk apparatus according to claim 6, wherein the jumping starting part operates the focus jumping part at an arbitrary phase in a case where a difference between a maximum value and a minimum value of a shape of surface deflection in one rotation of the recording medium is a predetermined value or less.

8. An optical disk apparatus according to claim 6, wherein the jumping starting part determines a phase at which the focus jumping part is operated, based on the measurement results of the surface deflection measuring part, only at a time of focus jumping conducted for the first time after activation of the apparatus, and subsequently operates the focus jumping part at the same phase in a case where the same recording medium is used at the same rotation speed.

9. An optical disk apparatus according to claim 6, wherein the surface deflection measuring part measures a shape of surface deflection for each of different rotation speeds of the recording medium, and
    the jumping starting part determines and stores a phase at which the focus jumping part is operated, for each of different rotation speeds of the recording medium based on the measurement results of the surface deflection measuring part, and switches the phase at which the focus jumping part is operated in accordance with the rotation speed of the recording medium.

10. An optical disk apparatus according to claim 1, wherein the surface deflection measuring part measures a shape of surface deflection of the recording medium at intervals of a predetermined time, and
    the jumping starting part includes a jumping timing calculating part for determining timing at which the focus jumping part is operated, in accordance with a positional change in the shape of surface deflection in a predetermined time, based on the measurement results of the surface deflection measuring part.

11. An optical disk apparatus according to claim 10, wherein the jumping timing calculating part determines timing at which a difference between a maximum value and a minimum value of the shape of surface deflection of the recording medium in the predetermined time is a predetermined value or less, as timing at which the focus jumping part is operated.

12. An optical disk apparatus according to claim 10, wherein the jumping timing calculating part determines timing at which a difference between a shape of surface deflection of the recording medium at an arbitrary time and a shape of surface deflection after the predetermined time is a predetermined value or less, as timing at which the focus jumping part is operated.

13. An optical disk apparatus according to claim 10, wherein the jumping timing calculating part operates the focus jumping part at an arbitrary timing in a case where a difference between a maximum value and a minimum value of a shape of surface deflection in one rotation time of the recording medium is a predetermined value or less.

14. An optical disk apparatus according to claim 10, wherein the jumping starting part uses the jumping timing calculating part to determine timing at which the focus jumping part is operated, based on the measurement results of the surface deflection measuring part, only at a time of focus jumping conducted for the first time after activation of the apparatus, and subsequently operates the focus jumping part at the same timing in a case where the same recording medium is used at the same rotation speed.

15. An optical disk apparatus according to claim 10, wherein the surface deflection measuring part measures a shape of surface deflection for each of different rotation speeds of the recording medium, and the jumping starting part uses the jumping timing calculating part to determine timing at which the focus jumping part is operated and stores the timing, for each of different rotation speeds of the recording medium, based on the measurement results of the surface deflection measuring part, and switches the timing at which the focus jumping part is operated in accordance with the rotation speed of the recording medium.

16. An optical disk apparatus according to claim 1, wherein the surface deflection measuring part measures a shape of surface deflection of the recording medium at intervals of a predetermined time, and the jumping starting part includes a jumping timing calculating part for determining timing at which the focus jumping part is operated, in accordance with an acceleration of surface deflection in a predetermined time, based on the measurement results of the surface deflection measuring part.

17. An optical disk apparatus according to claim 16, wherein the jumping timing calculating part determines timing at which a difference between a maximum value and a minimum value of an acceleration of surface deflection of the recording medium in the predetermined time is a predetermined value or less, as timing at which the focus jumping part is operated.

18. An optical disk apparatus according to claim 16, wherein the jumping timing calculating part determines timing at which a difference between an acceleration of surface deflection of the recording medium at an arbitrary time and an acceleration of surface deflection after the predetermined time is a predetermined value or less, as timing at which the focus jumping part is operated.

19. An optical disk apparatus according to claim 16, wherein the jumping timing calculating part operates the focus jumping part at an arbitrary timing in a case where a difference between a maximum value and a minimum value of an acceleration of surface deflection in one rotation time of the recording medium is a predetermined value or less.

20. An optical disk apparatus according to claim 16, wherein the jumping starting part uses the jumping timing calculating part to determine timing at which the focus jumping part is operated, based on the measurement results of the surface deflection measuring part, only at a time of focus jumping conducted for the first time after activation of the apparatus, and subsequently operates the focus jumping part at the same timing in a case where the same recording medium is used at the same rotation speed.

21. An optical disk apparatus according to claim 16, wherein the surface deflection measuring part measures a shape of surface deflection for each of different rotation speeds of the recording medium, and the jumping starting part uses the jumping timing calculating part to determine timing at which the focus jumping part is operated and stores the timing, for each of different rotation speeds of the recording medium, based on the measurement results of the surface deflection measuring part, and switches the timing at which the focus jumping part is operated in accordance with the rotation speed of the recording medium.

22. An optical disk apparatus according to claim 1, wherein the focus control part includes a low-pass filter that allows at least a rotation frequency of the recording medium to pass therethrough, and the surface deflection measuring part measures a shape of surface deflection of the recording medium, using an output signal from the low-pass filter.

23. An optical disk apparatus according to claim 1, wherein the surface deflection measuring part measures a shape of surface deflection of the recording medium by using a focus error signal.

24. An optical disk apparatus, comprising:

a moving part for moving a converged point of a light beam converged on a recording medium having a plurality of stacked recording/reproducing surfaces in a direction substantially vertical to the recording/reproducing surfaces;

a converged state detecting part for generating a signal corresponding to a converged state of the light beam on the recording medium;

a focus control part for driving the moving part in accordance with a focus error signal that is an output signal from the converged state detecting part, in such a manner that the light beam is converged at a substantially constant position on the recording medium;

a focus jumping part for moving the converged point of the light beam from an arbitrary recording/reproducing surface of the recording medium to another recording/reproducing surface thereof;

a surface deflection measuring part for measuring a shape of surface deflection of the recording medium;

a surface deflection storing part for storing the measurement results of the surface deflection measuring part in a memory successively on a predetermined phase basis over one rotation of the recording medium;

a converged position holding part for holding a converged position of the light beam at the beginning of focus jumping; and a surface deflection correcting part for updating the converged position of the light beam held by the converged position holding part during focus jumping, based on the stored values in the surface deflection storing part.

25. An optical disk apparatus according to claim 24, wherein the surface deflection correcting part includes an extracting part for extracting a stored value at the beginning of focus jumping and a stored value after a predetermined number of phases, based on the stored values in the surface deflection storing part, and updates the converged position of the light beam held by the converged position holding part during focus jumping by linear interpolation, using the two stored values extracted by the extracting part.

26. An optical disk apparatus according to claim 24, wherein the surface deflection storing part stores the measurement results of the surface deflection measuring part successively in a memory at intervals of a predetermined time over one rotation time of the recording medium.

27. An optical disk apparatus according to claim 26, wherein the surface deflection correcting part includes an extracting part for extracting a stored value at the beginning of focus jumping and a stored value after a predetermined time corresponding to focus jumping operation time, based on the stored values in the surface deflection storing part, and updates the converged position of the light beam held by the converged position holding part during focus jumping by linear interpolation, using the two stored values extracted by the extracting part.

* * * * *